Patented Aug. 11, 1931

1,818,311

UNITED STATES PATENT OFFICE

HUGH ALBERT EDWARD DRESCHER, WILLIAM SMITH, AND JOHN THOMAS, OF GRANGEMOUTH, SCOTLAND, ASSIGNORS TO SCOTTISH DYES, LIMITED, OF GRANGEMOUTH, SCOTLAND

PRODUCTION OF ANTHRAQUINONE DERIVATIVES

No Drawing. Application filed December 20, 1927, Serial No. 241,449, and in Great Britain July 21, 1925.

This invention which deals with matter divided from United States application No. 123,792 filed July 20th, 1926, and is a continuation in part of said application, relates to the preparation of anthraquinone derivatives and more specifically amino-anthraquinone derivatives.

It has for its object to provide improved or modified processes for preparing known substances and also to provide new products with processes for preparing them.

The invention consists in a process for the preparation of 1-halogen-2-amino-3-substituted derivatives of anthraquinone according to which halogenated amino-anthraquinone derivatives prepared from substituted α-amino and substituted β-amino-anthraquinones produced from (3'.4'-substituted)-2-benzoyl-benzoic acids, for instance, (3'.amino-4'-halogen)-2-benzoyl-benzoic acids or more particularly (3'-amino-4'-chlor)-2-benzoyl-benzoic acid are separated into two constituents, for instance, by fractional precipitation from sulphuric acid or by fractional crystallization from concentrated hydrochloric acid or from organic solvents.

The invention also consists in a process for the preparation of 1-brom-2-amino-3-chlor anthraquinone according to which mixed brominated chlor-amino-anthraquinones are dissolved in concentrated sulphuric acid and after dilution and maintaining at a substantially high temperature, cooling is effected whereby a sulphate is precipitated which is filtered off and hydrolysed with water resulting in the production of a bright orange coloured substance which dissolves in concentrated sulphuric acid to a golden yellow solution, is soluble in various organic solvents and has a constitution corresponding to 1-brom-2-amino-3-chlor anthraquinone.

The invention also consists in processes substantially as set forth below and in products which may be made by those processes including the application of these products in various ways.

The following examples illustrate how the invention may be carried into effect, references to parts being references to parts by weight:—

Example 1

This deals with a method of separating the mixture of brominated-chlor-amino-anthraquinones obtained by brominating the mixture of chlor α-amino and chlor β-amino anthraquinones produced from (3'-amino-4'-chlor)-2-benzoyl-benzoic acid.

10 parts of mixed brom-chlor-amino anthraquinones are dissolved in 100 parts of 96 per cent. sulphuric acid. After solution is complete, 20 parts of water are slowly added and the mixture is kept at 80° C. for ¼-hour.

It is then cooled to 30° C., filtered and washed with 80 per cent. sulphuric acid, and finally the cake is washed with water until free from acid. There is thus obtained a bright orange coloured brom-amino-anthraquinone which may be regarded as 1-brom-2-amino-3-chlor anthraquinone, as tests show that it contains substantially none of the α-amino isomer. It dissolves in sulphuric acid to a golden yellow solution and is soluble in various organic solvents. It has the following probable formula:

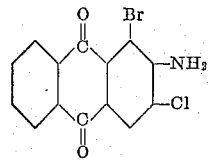

The filtrates are then drowned, and a product which we regard as the 1-amino-2-chlor-4-brom anthraquinone is obtained, having the following formula:

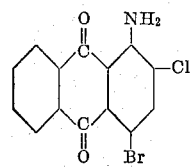

Example 2

This is a modification of Example 1.

If in the process of Example 1 instead of diluting down to 80 per cent. sulphuric acid the melt is diluted to 75 per cent. sulphuric acid, the aforesaid 1-brom-2-amino-3-chlor anthraquinone that is obtained does not appear to be quite free from the α-amino-anthraquinone body.

*Example 3*

This deals with the application of the separation process of Examples 1 and 2 to chlor derivatives; in a manner similar to that indicated in Examples 1 and 2 dichlorinated bodies can be separated.

If the two isomers are dissolved in about 15 times their weight of sulphuric acid and the acid then diluted to 80 per cent. strength, practically pure dichlor-β-amino anthraquinone separates out as a sulphate which can be hydrolyzed with water, and this we regard as the 1.3-dichlor-2-amino isomer, having the following formula:

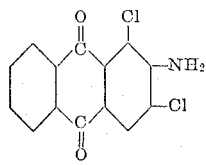

It melts at about 227.5–228° C., and is a bright orange coloured solid dissolving in sulphuric acid to a golden yellow solution.

*Example 4*

This is a modification of the sulphuric acid process of separation indicated in Examples 1 to 3.

According to this example separation of isomeric bodies can be effected with solvents other than sulphuric acid, for example by treatment with concentrated hydrochloric acid a product can be obtained which contains substantially less α-amino isomer than is present in the original mixture.

6 parts of the mixture are boiled with 10 parts concentrated hydrochloric acid and after cooling to 75° C. the mixture is filtered. The α-amino-body is more soluble in the hot acid than the β-body.

*Example 5*

This is a modified method of separating the constituents of the product referred to in Example 4, namely a method based on the use of organic solvents.

6 parts of the product referred to in Example 4 are boiled with 100 parts of tetrachlor ethane and after cooling the mixture is filtered.

The precipitate consists of substantially pure 1-brom-2-amino-3-chlor anthraquinone.

In this connection we have found that amongst the most suitable solvents may be mentioned nitrobenzene, tetra-chlor ethane and solvent naphtha. Phenol, cresol and such like bodies may also be used.

Acetic acid, pyridine, acetone and ethyl phthalate may be employed, but we do not regard them as quite as effective as the first group mentioned. We regard the degree of purification obtained with the ordinary alcohols such as methyl and butyl alcohol as less satisfactory.

In the case of chloroform and chlor-benzene several crystallizations should be used in order to obtain a product free from the α-amino isomer. Similarly solvent naphtha, acetic acid, ethyl phthalate, butyl alcohol, glycerine and acetone may be employed.

Having now described our invention, what we claim as new and desire to secure by Letters Patent is:—

1. In the process of separating a mixture of 1-bromo-2-amino-3-chlor-anthraquinone and 1 amino 2 chlor 4 bromo anthraquinone, the steps which comprise dissolving the mixture in approximately 96% sulphuric acid and adding water thereto in an amount sufficient to precipitate the 1-bromo-2-amino-3-chlor-anthraquinone but insufficient to precipitate appreciable quantities of the 1-amino-2-chlor-4-bromo-anthraquinone.

2. In the process of separating a mixture of about 10 parts of 1-bromo-2-amino-3-chlor-anthraquinone and 1-amino-2-chlor-4-bromo-anthraquinone, the steps which comprise dissolving the mixture in about 100 parts of sulphuric acid of approximately 96% strength and adding water thereto in an amount sufficient to precipitate the 1-bromo 2-amino-3-chlor-anthraquinone but insufficient to precipitate appreciable quantities of the 1-amino-2-chlor-4-bromo-anthraquinone.

3. In the process of separating a mixture of 10 parts of 1-bromo-2-amino-3-chlor-anthraquinone and 1-amino-2-chlor-4-bromo anthraquinone the steps which comprise dissolving the mixture in about 100 parts of sulphuric acid of approximately 96% strength and, after solution is completed, slowly adding about 20 parts of water maintaining a temperature of about 80° C. for about ¼ of an hour cooling to about 30° C. and separating the filtrate from the residue.

In testimony whereof we have signed our names to this specification.

HUGH ALBERT EDWARD DRESCHER.
WILLIAM SMITH.
J. THOMAS.